Dec. 19, 1933.  H. A. WEINLICH  1,940,234
LINE SPACING DEVICE FOR TABULATING MACHINES
Filed July 1, 1927   3 Sheets-Sheet 2

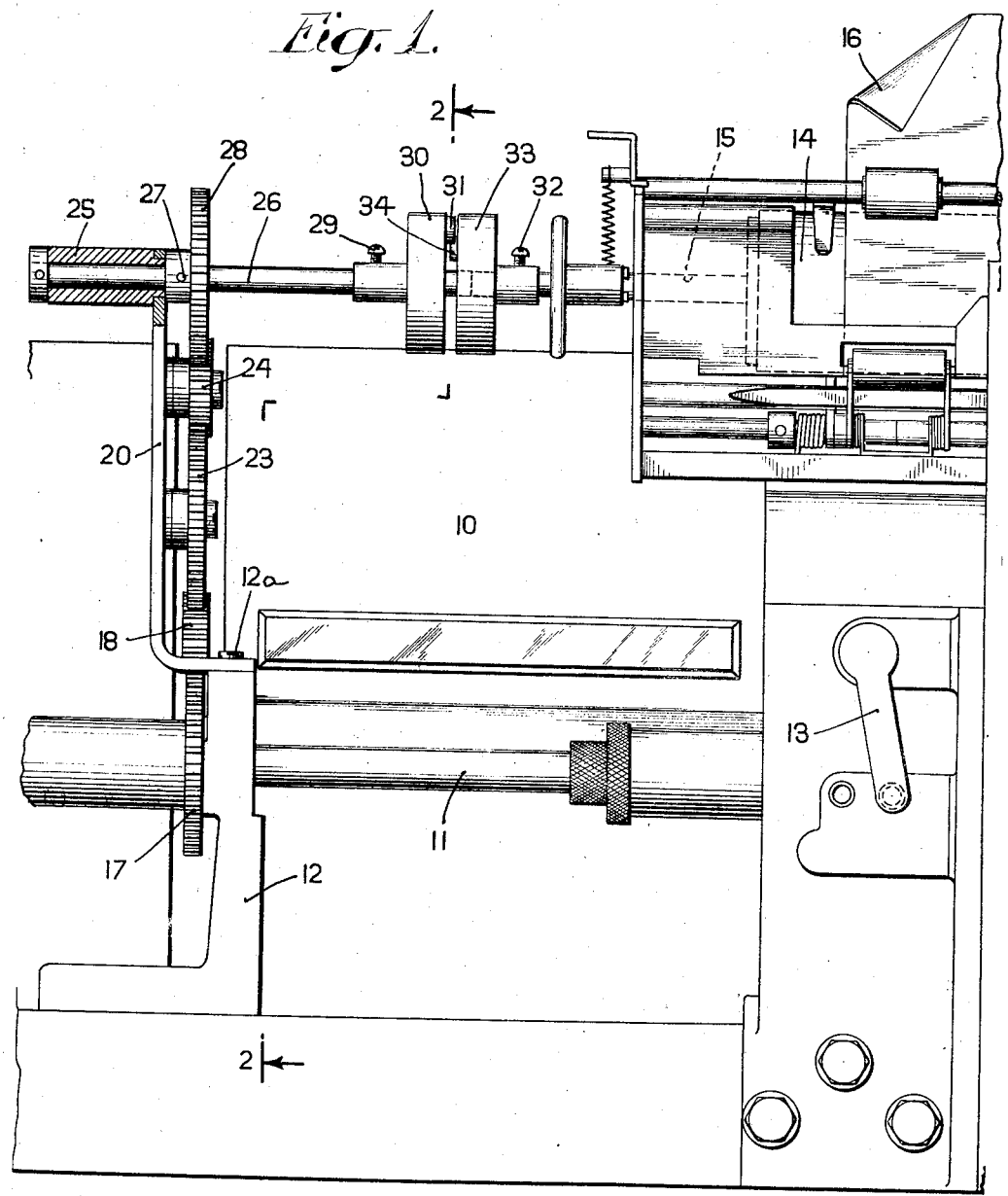

Inventor
Hermann Adalbert Weinlich
By his Attorney

Dec. 19, 1933.  H. A. WEINLICH  1,940,234
LINE SPACING DEVICE FOR TABULATING MACHINES
Filed July 1, 1927  3 Sheets-Sheet 3

INVENTOR
HERMANN ADALBERT
WEINLICH
BY
ATTORNEY

Patented Dec. 19, 1933

1,940,234

UNITED STATES PATENT OFFICE 1,940,234

LINE SPACING DEVICE FOR TABULATING MACHINES

Hermann Adalbert Weinlich, Berlin, Germany, assignor, by mesne assignments, to International Business Machines Corporation, New York, N. Y., a corporation of New York Application July 1, 1927, Serial No. 202,781

4 Claims. (Cl. 235—58)

This invention relates to printing and listing tabulating machines wherein a record sheet is advanced step by step or line by line after each cycle of operation and more particularly to a device for automatically advancing a record sheet to a predetermined position.

For the purpose of clearly illustrating my invention I have shown it as applied to a tabulating machine of the type disclosed in the patent to C. D. Lake, No. 1,379,268, dated May 24, 1921.

An object of my invention is to provide a practical and efficient means for automatically advancing a record sheet to a predetermined position.

Another object is to provide a device for automatically positioning a record sheet to a predetermined position subsequent to a totaling operation of the printed items on a record sheet.

Various other objects and advantages of my invention will be obvious from the following particular description of one form of mechanism embodying the invention or from an inspection of the accompanying drawings; and the invention also constitutes certain new and novel features of construction and combination of parts hereinafter set forth and claimed.

In the accompanying drawings I have shown for the purposes of illustration one form of mechanism embodying the invention in which:

Fig. 1 is a fragmentary end view of a tabulating machine disclosing the platen roll having a record sheet thereon and my automatic means for adjusting the sheet to a predetermined position.

Figure 3:
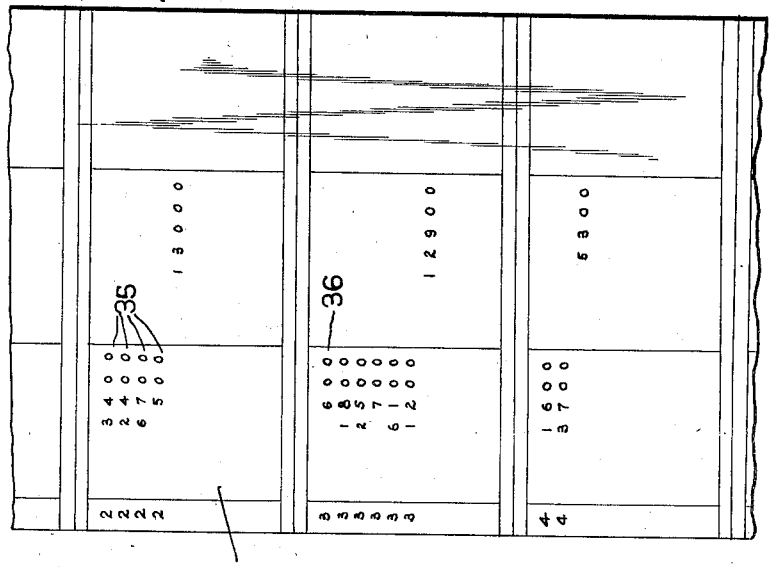
Fig. 3 is a view of a portion of a record sheet showing groups of items printed under control of my record feeding means.

Referring now to Fig. 1 the tabulating machine as disclosed comprises a counter casing 10, a reset shaft 11, a bracket 12, through which the reset shaft revolves, a listing and non-listing handle 13, a platen roll 14 mounted on a shaft 15 and a record sheet 16.

Figure 2:
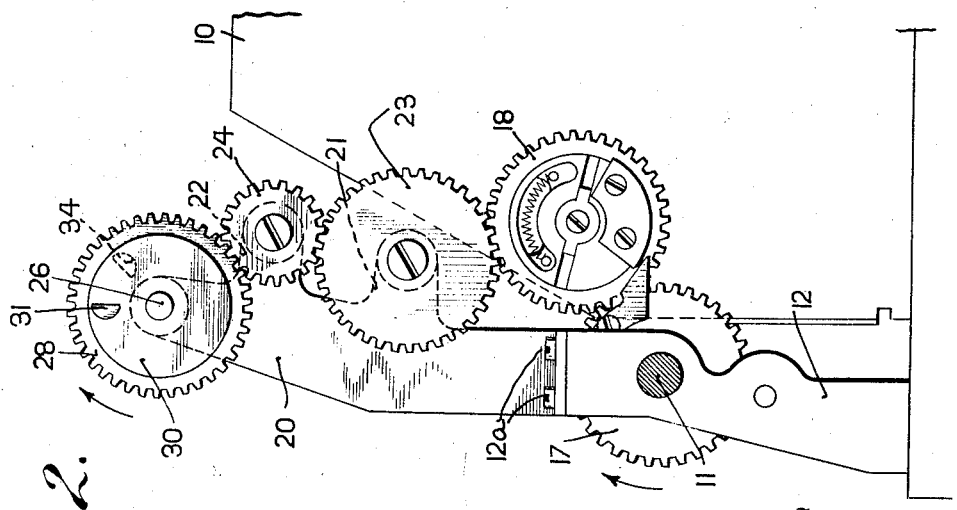
Fig. 2 is a sectional view taken substantially on line 2—2 of Fig. 1, showing the means for resetting the accumulators on the tabulating machine and also the means for driving my device.

Fixed on the reset shaft 11 is a gear 17 which when rotated by the shaft during a resetting operation turns in a clockwise direction as viewed in Fig. 2. This gear meshes with a counter gear 18 connected to one of the accumulators of the machine. The clockwise movement of the reset gear 17 turns the counter gear 18 in the opposite direction resulting in the counter associated with the gear being zeroized. As the resetting of the counters of a tabulating machine is clearly disclosed in the patent above referred to, it will, therefore, be unnecessary for me to go into detail. Reference may be also had to the Lake Patent No. 1,600,414, Sept. 21, 1926 which also shows details of construction of the resetting devices of the machine.

Fixed to the bracket 12 by means of screws 12a is another bracket 20 having lateral projections 21 and 22 upon which are rotatably mounted transmission gears 23 and 24, respectively. Mounted in a bearing 25 in the upper end of the bracket 20 as viewed in Fig. 1 is a shaft 26 upon which is rigidly mounted by means of a pin 27, a gear 28, meshing with the transmission gear 24. Also adjustably mounted near the end of shaft 26 by means of a set screw 29, is a wheel 30 carrying a stud 31. The purpose of this stud will be presently described. Mounted on the left end of the platen shaft 15 by means of a set screw 32 is a wheel 33 similar to wheel 30 previously described. This wheel also has fixed thereto a stud 34 which cooperates with the stud 31 on the wheel 30. The wheel 30 is mounted so as to reach slightly beyond the end of its shaft 26 thus permitting the shaft 26 to reach into the bore of wheel 33, the wheel 30 thus acting as a bearing for the right hand end of shaft 26, the shaft, of course, being free to rotate with respect to the wheel 33.

Referring to Fig. 3 we will assume that the record sheet 16 on the platen roll 14 is ruled as shown here and has been adjusted in the machine so that the first item 3400 will be printed in the position shown. We will also assume that the machine during operation has listed four items as shown at 35 on the record sheet. It is necessary, of course, to rotate the platen 14 an increment as an incident to a line spacing operation to suitably line space the items on the paper strip. Any desirable means may be provided to effect this but the preferred construction comprises that shown in the patent to Lake and Page, No. 1,757,123, May 6, 1930 in which patent a train of mechanism extending between the platen and listing shaft is shown and described particularly at line 119 of page 4 to line 7 of page 5. It is understood however that the connections from the total shaft for operating the line spacing mechanism shown in the patent are to be omitted and the connections described in the preceding paragraph are substituted therefor. The stud 31 on the wheel 30 mounted on the shaft 26 will remain in its normal position due to the fact that during the listing operation of the machine the shaft 26 does not rotate.

The present improvements have been embodied in a tabulating machine of the type shown in the patent to Daly et al. #1,762,145 to which reference may be had for further details of construction and operation. However, in order to more clearly understand the invention, reference will be made to Fig. 4 which discloses a wiring diagram of the machine disclosed in the patent and illustrates the elements coordinated with the present improvements.

Figure 4:
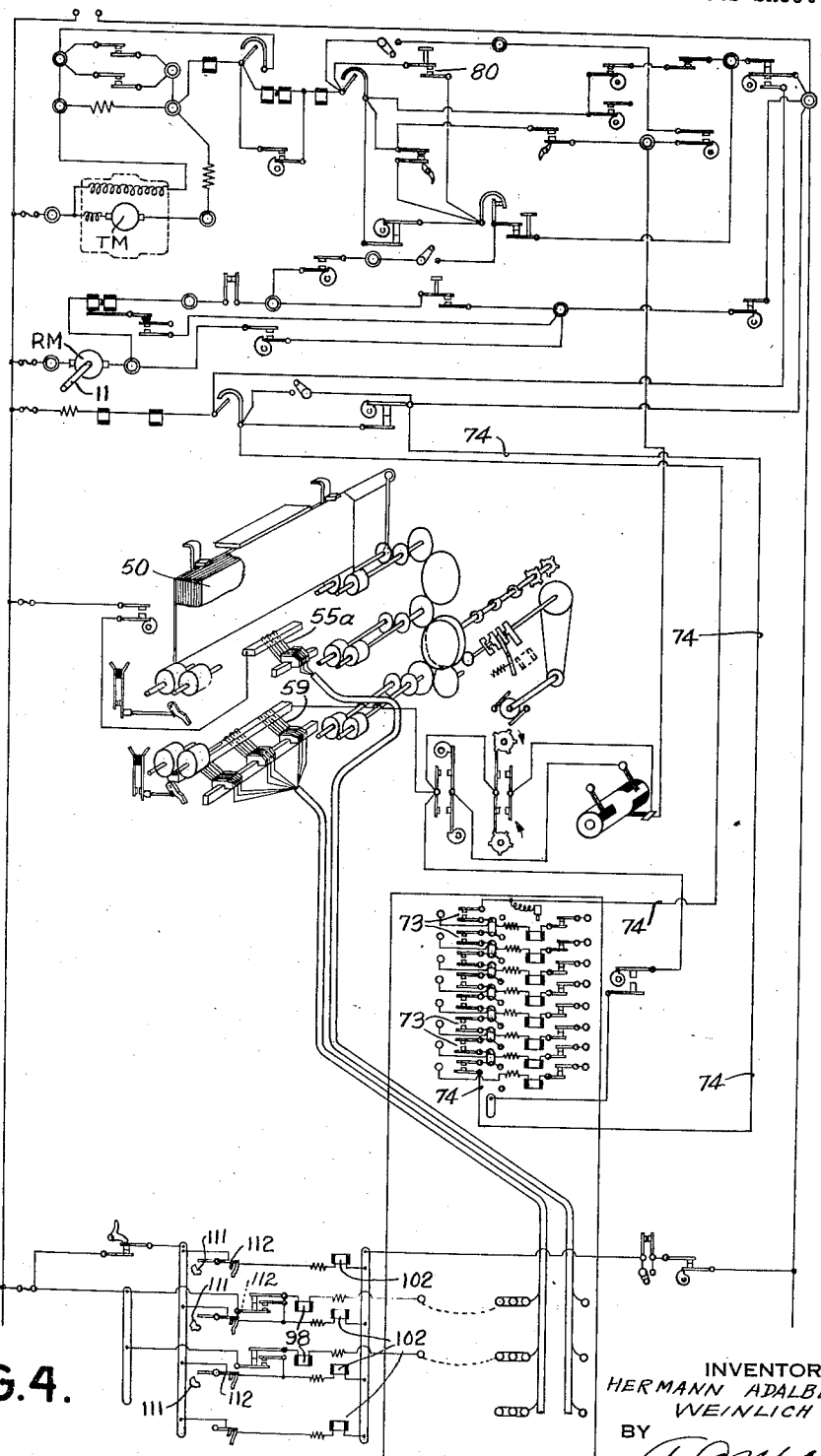
Fig. 4 is a wiring diagram of the tabulating machine to which the present improvements are applied.

As shown in Fig. 4 and more fully in the Patent #1,762,145 a tabulating motor TM is provided which, under control of a manually operated starting key 80, is adapted to be started thereby feeding by means of the usual card feeding devices tabulating cards 50 so that the perforations therein are analyzed by the upper or control brushes 55a and the lower or adding brushes 59. The lower brushes are adapted to be plugged so as to control the printing control magnets 102 and the adding control magnets 98. Printing control magnets 102 are adapted to selectively call the item type into operation so that a plurality of such type, which comprise the printing mechanism, are adapted to print upon the sheet 16 the items designated by the various controlling cards. A series of such item printing operations are effected but upon a change of group designation, which is sensed by means of the upper control brushes 55a in conjunction with the lower brushes 59, tabulating operations cease. Upon change in group classification one of the group control contacts 73 will open thereby opening a control circuit 74 which will stop the operation of the tabulating motor TM and automatically start the operation of the reset motor RM. During the resetting and total taking operation contacts 112 will close at different points in the cycle depending upon the position of the stepped cam 111. The latter, as more fully described in the patent, is adjusted under control of the adding elements controlled by the adding magnets 98. The closure of such contacts 112 will thereby energize the printing control magnet 98 at a certain point in the cycle of operation to thereby call a printing type in operation so that a plurality of type effect printing on the sheet the total of the items standing upon the accumulator elements. For the arrangement disclosed in Fig. 3, the printing elements selected for total printing operations comprise a separate set so that total printing may be effected in a column adjacent to the column in which item printing operations are effected. During the total printing operations the accumulator elements are also reset under control of the shaft 11 which, by means more fully disclosed in the Patent #1,762,145, is given an operation of a single revolution. The reset shaft 11 is adapted to be operated after the total printing operation so that in turning, it will turn a gear 17 loosely mounted on the resetting shaft in a clockwise direction as viewed in Fig. 2. This gear meshing with the counter gear 18 as previously described will turn the counter gear in a counter clockwise direction clearing the accumulator or in other words zeroizing it. The actuation of the counter gear 18 by the reset gear 17 will in turn cause the transmission gears 23 and 24 to function which in turn will rotate the shaft 26 through the medium of the gear 28. The resetting operation of shaft 11 will thus cause shaft 26 to turn one complete revolution where it again stops. During the rotation of the shaft 26 the stud 31 will come in contact with the stud 34 in the position to which the stud 34 has been actuated by the feeding of the record sheet and carry it from this point; the remaining distance to complete its cycle. In other words, during the reset operation of the machine through the gearing mentioned the wheel 30 is turned a complete cycle and through the studs 31 and 34 abutting each other the platen roll 14 will be rotated and the record sheet 16 will be advanced to receive the next listing operation in a predetermined position as shown at 36 in Fig. 3.

It is obvious that the more listings there are on a record sheet, the stud 34 will be moved further away from its normal position during the listing operations and when the reset shaft 11 functions the stud 31 through gearing heretofore mentioned will be rotated causing it to abut its associated stud 34 and carrying it along until the wheel 30 has completed a cycle, thereby positioning the record sheet in a predetermined position.

If it is not desired to use the device for adjusting the record sheet to these predetermined positions after each totaling operation the set screw 29 may be loosened and the wheel 30 moved out of cooperation with wheel 33.

In order to vary the fields on the record sheet so that the distance through which the sheet is fed from one field to the next after each totaling operation may be greater or less than disclosed, the ratio between gears 17 and 28 may be varied. Thus a resetting cycle of operation of shaft 11 will cause a greater or less degree of rotation of shaft 26.

While I have shown and described and pointed out the fundamental novel features of the invention as applied to a single modification it will be understood, that various omissions and substitutions and changes in the form and details of the device illustrated and in its operation may be made by those skilled in the art without departing from the spirit of the invention. I intend to be limited therefore only as indicated by the scope of the following claims:

What is claimed is:

1. In an accounting machine, the combination with a disk rotatable with a platen, of a companion disk, automatic means operable during item entering operations for effecting a variable separation between engageable elements secured to each of said disks, devices for automatically predetermining non-item entering operations of the machine upon completion of a variable number of item entering operations, and a shaft driven under control of said devices a single revolution and only during predetermined non-item entering operations, said shaft carrying the companion disk to thereby cause rotation of the latter to effect an additional but variable rotation of said platen dependent upon the number of item entering operations performed.

2. In a record controlled machine, printing devices, a platen roll operated for line spacing a supported record sheet, and operable automatically as an incident to the operation of the printing devices under control of record cards for operating said platen roll thereby automatically positioning the record sheet to a certain position with respect to said printing devices upon completion of a variable number of item imprints, automatic means operable under control of records for determining total printing operations by said printing devices, driving means, means interposed between the platen roll and said driving means for controlling the variable but additional actuation of the platen roll from the predetermined position the extent of actuation being dependent upon the number of item imprints effected, after said printing devices have printed the total, said driving means being called into operation automatically under control of the total printing determining means.

3. In an accounting machine, the combination with a rotatably mounted platen, of a disk carrying a projection, said platen and disk adapted to be moved together when said platen is rotated for line spacing operations occurring during each of a variable number of item entering operations; a driver for driving said platen additionally to a predetermined position and operated as an incident to other types of machine operations, automatic means for effecting selective operations of said driver, said driver including a driving element having a projection adapted to come into engagement with the projection carried by said disk at variable points in the operating movement of the driving element, said points being governed by the number of item entering operations effected, and means whereby said driver and driven element may be relatively separated to prevent the effectivity of said driver in its operation.

4. In a machine of the class described the combination with devices adapted to be reset, of means adapted to be actuated in response to printing operations to line space a record strip in increments to separate the items printed, means for resetting said devices, automatic means for predetermining the selective operation of the resetting means, and means controlled by the resetting means for operating the first mentioned means during resetting operations for feeding the record strip a variable amount dependent upon the number of items printed for feeding the record strip to a certain printing position.

HERMANN ADALBERT WEINLICH.